United States Patent [19]
Dugger

[11] Patent Number: 5,547,210
[45] Date of Patent: Aug. 20, 1996

[54] TRAILER HITCH

[75] Inventor: James B. Dugger, Phoenix, Ariz.

[73] Assignee: Hitchquick, Inc., Tempe, Ariz.

[21] Appl. No.: 403,476

[22] Filed: Mar. 14, 1995

[51] Int. Cl.⁶ ................................................. B60D 1/36
[52] U.S. Cl. .................... 280/477; 280/479.2; 280/479.3
[58] Field of Search ................................. 280/477, 504, 280/478.1, 508, 479.2, 511, 479.3, 416.1

[56] References Cited

U.S. PATENT DOCUMENTS

| 4,944,525 | 7/1990 | Landry | 280/479.3 |
| 4,951,957 | 8/1990 | Gullickson | 280/479.3 X |
| 4,991,865 | 2/1991 | Francisco | 280/479.3 X |
| 5,277,477 | 1/1994 | Blaser | 280/479.3 X |
| 5,288,096 | 2/1994 | Degelman | 280/479.3 X |
| 5,322,315 | 6/1994 | Carsten | 280/479.2 |

Primary Examiner—Eric D. Culbreth
Assistant Examiner—Victor E. Johnson
Attorney, Agent, or Firm—LaValle D. Ptak

[57] ABSTRACT

A trailer hitch is designed to be inserted in a conventional square-shaped sleeve or receiver fixed to the back of a vehicle. The hitch includes a sleeve and an arm which is received by and pivots simultaneously with the sleeve.

4 Claims, 2 Drawing Sheets 5,547,210

TRAILER HITCH

BACKGROUND OF THE INVENTION

1. Field of the Invention

This invention relates to a trailer hitch.

More particularly, the invention relates to a trailer hitch which can be inserted in a conventional square-shaped sleeve or receiver that is affixed to the rear of a vehicle and relates to a trailer hitch which includes a sleeve and an arm which pivot simultaneously to facilitate the attachment of the hitch to a trailer.

2. Description of the Prior Art

Various description of h prior arts trailer hitch structures are well known in the art. See, for example, U. S. Pat. Nos. 5,011,176 to Eppinette, 4,944,525 to Landry, 5,342,076 to Swindall, 3,860,267 to Lyons, 4,991,865 to Francisco, 3,191,967 to Penk, 3,126,210 to Hill, 3,622,182 to Grosse-Rhode, 5,344,175 to Speer, 4,951,957 to Gullickson, 5,322, 315 to Carsten, 4,792,153 to Galdes, and 4,211,428 to Barcus. See also UK Patent No. 628,910 to Ferguson, Inc., and Swedish Patent No. 164,751 to Lihnell Vagn AB, Rinstrorp. None of the prior art trailer hitch structures appear, however, to disclose a trailer hitch having a ball mounted on an arm which is extendible, which can be simultaneously rotated with a sleeve carrying the arm, and which permits ready adjustment of the "drop", i.e. elevation, of the ball with respect to the arm or with respect to the bumper of the vehicle on which the hitch is mounted.

Accordingly, it would be highly desirable to provide a trailer hitch which would permit the trailer hitch ball to be readily simultaneously rotated and extended through a large arc of travel, which would permit the ball to be extended away from the vehicle carrying the trailer hitch, and which would permit ready alteration of the drop of the trailer hitch ball.

Therefore, it is a principal object of the invention to provide an improved trailer hitch.

A further object of the invention is to provide an improved trailer hitch having a arm which carries the trailer hitch ball and which can be simultaneously pivoted and extended with respect to the vehicle on which the trailer hitch is mounted.

Another object of the invention is to provide an improved trailer hitch which permits ready adjustment of the drop of the trailer hitch ball.

These and other, further and more specific objects and advantages of the invention will be apparent to those skilled in the art from the following detailed description thereof, taken in conjunction with the drawings.

SUMMARY OF THE INVENTION

Briefly, in accordance with my invention, I provide a trailer hitch assembly including a first hollow sleeve; a fastener for securing the hollow sleeve to the rear of a vehicle; a first arm slidably received in the sleeve; a fastener for securing the arm in the sleeve; a second hollow sleeve pivotally attached to the first arm; a second arm mounted in the second sleeve to pivot simultaneously with the second hollow sleeve. The second arm includes a first end slidably received in and extendable from the second sleeve, and a second end spaced apart from the second sleeve. A trailer hitch ball is mounted on the second end of the second arm.

DESCRIPTION OF THE PREFERRED EMBODIMENTS

Figure 1:
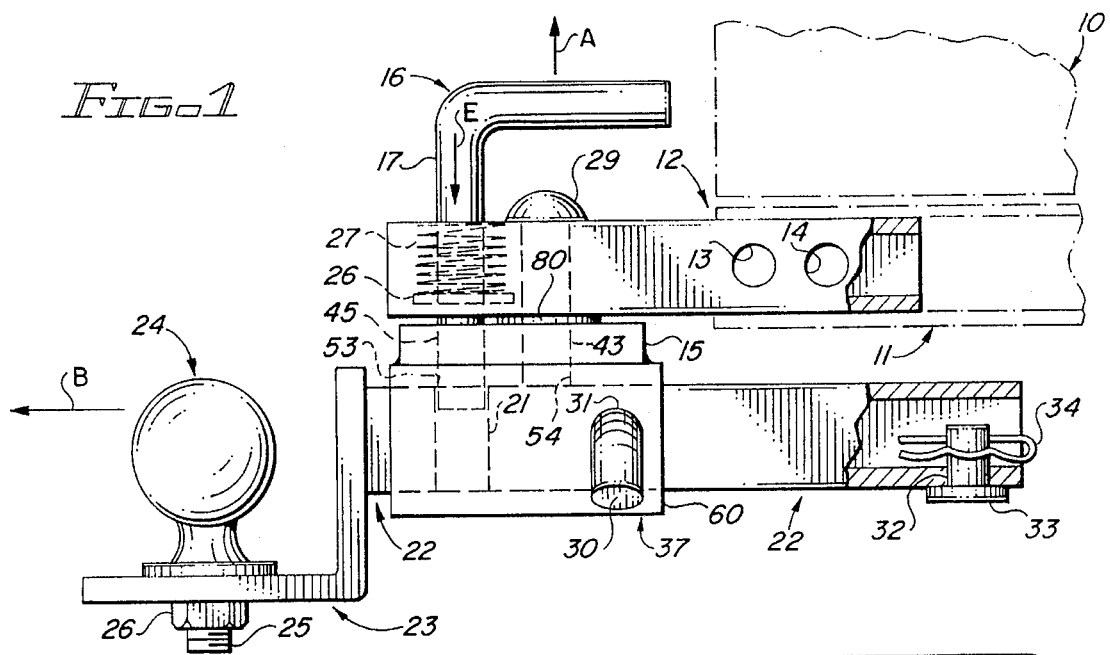
FIG. 1 is a side elevation view illustrating a trailer hitch constructed in accordance with the principles of the invention.
Figure 3:
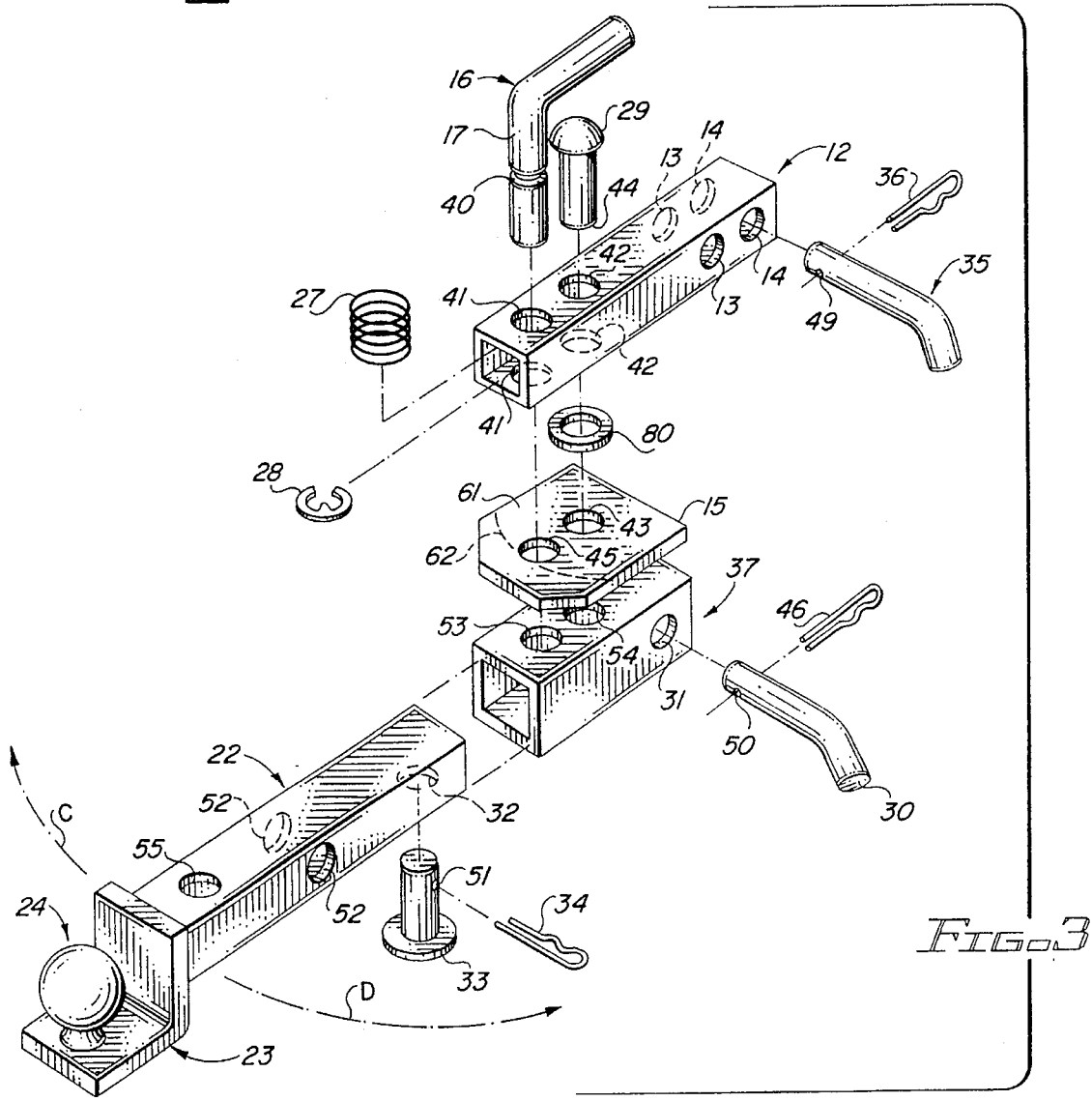
Figure 2:
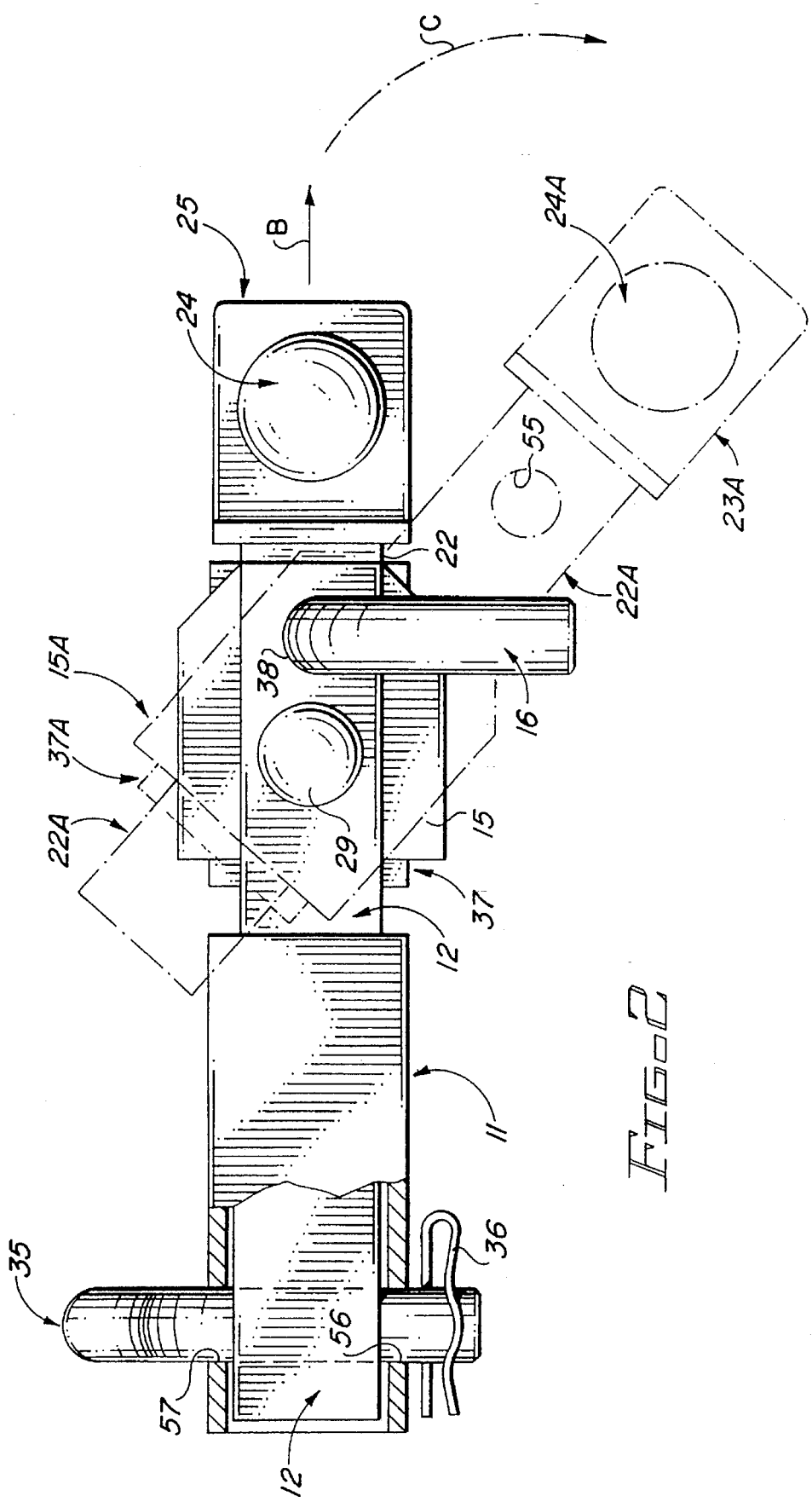
FIG. 2 is a top view illustrating further construction details and the mode of operation of the trailer hitch of FIG. 1; and, FIG. 3 is an exploded assembly view illustrating the components of the trailer hitch of FIGS. 1 and 2.

Turning now to the drawings, which depict the presently preferred embodiment of the invention for the purpose of illustrating the practice thereof and not by way of limitation of the scope of the invention, and in which like characters refer to corresponding elements throughout several views, the trailer hitch of FIGS. 1 to 3 includes a first arm 12 sized to be slidably inserted in a conventional hollow, square, receiver sleeve 11. Sleeve 11 is welded, bolted, or otherwise fastened to the rear of a vehicle, typically beneath the rear bumper 10 of the vehicle. One end of sleeve 11 includes apertures 37 and 56 (FIG. 2) which receive the end of a pin 35 which extends through sleeve 11 and through arm 12 in the manner shown in FIG. 2 in order to secure arm 12 in sleeve 11. One leg of cotter pin 36 is removably inserted through aperture 49 in pin 35 to secure pin 35 in place through apertures 57, 56 in sleeve 11 and through apertures 13 or 14 formed through opposing walls in hollow, square arm 12.

Leg 17 of pin 16 normally slidably extends through apertures 41 in arm 12, through aperture 45 in plate 15 and through aperture 53 in the top of sleeve 37. Washer 80 is intermediate plate 15 and arm 12. When pin 16 is in the position shown in FIG. 1, plate 15, sleeve 37, and arm 22 are prevented from rotating with respect to sleeve 12. Pin 29 extends through apertures 42 in arm 12, through aperture 43 in plate 15 and through aperture 54 in sleeve 37. The lower end 44 of pin 29 is welded or otherwise fixedly secured to apertures 43 and 54. Plate 15 is welded or otherwise fixedly secured to sleeve 37. However, pin 29 freely rotates in apertures 42 such that plate 15—sleeve 37—arm 22 and pin 29 can (after pin 16 is pulled upwardly in the direction of arrow A to remove arm 17 from apertures 53 and 45) be pivoted with respect to sleeve 12 in the directions indicated by arrows C and D in FIG. 3. When arm 22 pivots in the directions of arrows C and D, sleeve 12 is stationary and does not move.

In FIG. 1, spring 27 circumscribes arm 17 and is compressed between C-clip 28 and the top of hollow arm 12. C-clip 28 clips into circular groove 40 formed around the outer cylindrical surface of arm 17. Compressed spring 27 normally presses against C-clip 28 in the direction of arrow E and acts to press the lower end of arm 17 in the direction of arrow E into apertures 45 and 53.

When arm 22 is slid into sleeve 37 to the position shown in FIG. 1, pin 30 extends through apertures 31 and apertures 52 in arm 22 to secure arm 22 in sleeve 37 in the position shown in FIG. 1. When pin 30 is slid through apertures 31 and 52,- the distal end of pin 30 extends outwardly from sleeve 37. The distal end of pin 30 includes cylindrical aperture 50 formed through pin 30. One leg of cotter pin 46 is removably inserted through aperture 50 to prevent pin 30 from sliding out from apertures 31 and 52.

An aperture 32 formed in one end of arm 22 slidably receives the end of pin 33. Aperture 51 formed through pin 33 slidably removably receives one leg of cotter pin 34 in the manner shown in FIG. 1 to secure pin 33 in aperture 32. When arm 22 is slid in the direction of arrow B in FIG. 1, the head of pin 33 impacts the end 60 of sleeve 37 and stops movement of arm 22 in the direction of arrow B.

L-shaped member 23 is welded or otherwise attached to the other end of arm 22 and carries hitch ball 24 attached to threaded end 25. Nut 26 is turned onto threaded end 25 to secure ball 24 on member 23. The shape and dimension of member 23 can be varied such that the distance of ball 24 beneath sleeve 11 in FIG. 1 can be varied. For example, one arm 22 can be equipped with an L-shaped member 23 which positions the top of ball 24 one inch below the bottom of sleeve 11 in FIG. 1. A second arm 22 can be equipped with an L-shaped member 23 which has a longer upstanding arm and which positions ball 24 two inches below the bottom of sleeve 11. Accordingly, providing a user with two or more arms 22 each having an L-shaped member 23 which positions a ball at a different elevation with respect to sleeve 11 can facilitate the adapting of the hitch of the invention to vehicles in which sleeve 11 is positioned at differing heights above the ground. In one vehicle it may be desirable to have the top of ball 24 only one inch below the bottom of sleeve 11. In another vehicle it may be desirable to have the top of ball 24 two inches below the bottom of sleeve 11. The hitch of the invention can be readily adapted for either vehicle by slidably inserting in sleeve 37 an arm 22 having the member 23 which provides the desired amount of drop.

In use, an arm 22 having a member 23 with the desired drop for ball 24 is slid into sleeve 37. Pin 30 is slid through apertures 31 and 52 to secure arm 22 in sleeve 37. Pin 33 is slid through aperture 32 to the position shown in FIG. 1, and cotter pin 34 is slid through aperture 51 to secure pin 33 on arm 22. Arm 12 is slid into the receiver sleeve 11 fixedly secured to the bumper 10 of a pickup truck or other vehicle. Pin 35 is slid through apertures 37, 14 (or 13), and 56 to secure arm 12 in sleeve 11. One leg of cotter pin 36 is inserted through aperture 49 to secure pin 35 in sleeve 11 and arm 12. When it is desired to couple the socket of a trailer to ball 24, cotter pin 46 is removed from pin 30 and pin 30 is pulled out from sleeve 37 and arm 22 such that arm 22 can, if necessary, be slid outwardly from sleeve 37 in the direction of arrow B. Further, if it is necessary to rotate arm 22 in one of the directions indicated by arrows C and D (FIG. 3) in order to position ball 24 with respect to the trailer socket, then pin 16 is grasped and lifted upwardly in the direction of arrow A in FIG. 1 until leg 17 is pulled completely out of apertures 53 and 45. Once leg 17 is upwardly displaced in the direction of arrow A to clear apertures 53 and 45, then arm 22, sleeve 37, and plate 15 can be rotated simultaneously without restriction in either one of directions C and D. As soon as arm 22 and plate 15 are rotated enough to move apertures 45 and 53 out of alignment with leg 17 and apertures 41, then pin 16 can be released. When pin 16 is released, spring 27 presses the bottom of leg 17 against the top 61 of plate 15. Top 61 contacts and slides over the bottom of leg 17 along the path indicated by arcuate dashed line 62 in FIG. 3. When arm 22 is pivoted such that apertures 45 and 35 align with apertures 41, then compressed spring 27 forces leg 17 downwardly back through apertures 45 and 53 to the position shown in FIG. 1 to lock plate 15 and sleeve 37 in position and to prevent the simultaneous rotation of plate 15—sleeve 37—arm 22. A stop can be secured to the top of plate 15 such that the stop contacts the bottom of leg 17 after leg 17 slides a selected distance along path 62 while plate 15 pivots in the direction of arrow C or D. When the stop contacts the bottom of leg 17, the stop prevents further movement of plate 15 in the direction of arrow C or D.

Ordinarily, in order to position ball 24 adjacent the socket of a trailer so that the socket can be lowered onto ball 24, it will be advantageous both to pivot arm 22 in one of the directions indicated by arrows C and D and to remove pin 30 so that arm 22 can be slid out of sleeve 37 in the direction of arrow B. After the socket of a trailer is secured on ball 24, the pickup truck or other vehicle carrying the assembly is preferably pulled forward until arm 22 pivots to a position in which apertures 41, 45, and 53 align and spring 27 forces arm 17 downwardly through apertures 45 and 53 to the position shown in FIG. 1. The pickup truck is then backed up so that arm 22 slides into sleeve 37 until the aperture 55 is aligned with the aperture 53 in the sleeve 37. When this occurs, the spring 27 forces the arm or leg 17 downwardly into the aperture 55 to lock the entire assembly together, as shown in FIG 1. This causes the entire assembly to be rigidly locked together automatically by the action of the spring loaded leg or arm 17. At the same time, aperture 31 and 52 are aligned, after which safety pin 30 is slid through apertures 31 and 52 to secure arm 22 in fixed position in sleeve 37 in the position shown in FIG. 1.

The extension and pivoting of arm 22 is illustrated in FIG. 2. In particular, in FIG. 2 dashed lines 37A, 15A, 22A, 16A, 23A, and 24A illustrate the position of arm 22, sleeve 37, plate 15, pin 16, member 23, and ball 24 after pin 30 is removed from sleeve 37 and arm 22, after pin 16 is lifted upwardly out of apertures 45 and 53, after arm 22 is slid out of sleeve 37 in the direction of arrow B, and after arm 22 is pivoted in the direction of arrow C.

Having described my invention in such terms as to enable those skilled in the art to understand and practice it, and having described the presently preferred embodiments thereof, I Claim:

I claim:

1. A trailer hitch assembly for use with a hollow rectangular receiver sleeve attached to the rear of a vehicle; said assembly including in combination:

a first arm adapted to be slidably received in said receiver sleeve and releaseably secured therein;

a second hollow sleeve freely pivotally attached to said first arm and capable of 360° rotation therewith and located below said first arm;

a second arm slidably mounted in said second sleeve for simultaneous pivoting therewith and extendable from a first position substantially underlying said hollow receiver sleeve to a second position with an end thereof extending outwardly beyond the rear of a vehicle;

a trailer hitch attachment member mounted on said end of said second arm; and a releasable locking member carried by said first arm to engage and lock both said second hollow sleeve and said second arm when said second arm is in said first position and said second hollow sleeve is aligned with said receiver sleeve to secure said second hollow sleeve against pivotal rotation relative to said first arm when said vehicle tows a trailer.

2. The combination according to claim 2 wherein said second hollow sleeve has an aperture therein and said locking member comprises a spring loaded leg extending through said first arm for releasable insertion into said aperture in said second hollow sleeve.

3. The combination according to claim 2 wherein said second arm has an aperture therein which is aligned with the aperture in said second hollow sleeve when said second arm is in said first position; so that said spring loaded leg extends through said first arm and through the aperture in said second hollow sleeve into the aperture in said second arm, when said second arm in said first position and said second hollow sleeve is aligned with said receiver sleeve.

4. The combination according to claim 3 wherein said spring loaded leg normally is spring biased toward engagement with the aperture in said second hollow sleeve.

\* \* \* \* \*